United States Patent
Mattarocci

(10) Patent No.: US 10,276,016 B2
(45) Date of Patent: Apr. 30, 2019

(54) CHILD ABANDONMENT MONITOR

(71) Applicant: Baby Trend, Inc., Ontario, CA (US)

(72) Inventor: Bradley James Mattarocci, Rancho Cucamonga, CA (US)

(73) Assignee: Baby Trend, Inc., Ontario, CA (US)

( * ) Notice: Subject to any disclaimer, the term of this patent is extended or adjusted under 35 U.S.C. 154(b) by 0 days.

(21) Appl. No.: 15/677,722

(22) Filed: Aug. 15, 2017

(65) Prior Publication Data
US 2018/0096578 A1   Apr. 5, 2018

Related U.S. Application Data

(60) Provisional application No. 62/403,960, filed on Oct. 4, 2016.

(51) Int. Cl.
| | |
|---|---|
| *G08B 23/00* | (2006.01) |
| *G08B 21/02* | (2006.01) |
| *B60N 2/28* | (2006.01) |
| *B60N 2/00* | (2006.01) |
| *G08B 21/00* | (2006.01) |

(52) U.S. Cl.
CPC ......... *G08B 21/0288* (2013.01); *B60N 2/002* (2013.01); *B60N 2/28* (2013.01); *B60N 2/2821* (2013.01); *G08B 21/00* (2013.01); *G08B 21/0266* (2013.01); *G08B 21/0277* (2013.01)

(58) Field of Classification Search
CPC ..... G08B 21/0202; G08B 23/00; B60N 2/002
USPC ............... 340/573.1, 539.11, 539.21, 539.23
See application file for complete search history.

(56) References Cited

U.S. PATENT DOCUMENTS

| | | | |
|---|---|---|---|
| 5,683,103 | A | 11/1997 | Blackburn et al. |
| 5,949,340 | A | 9/1999 | Rossi |
| 6,598,900 | B2 | 7/2003 | Stanley et al. |
| 6,696,943 | B1 | 2/2004 | Elrod et al. |
| 6,714,132 | B2 | 3/2004 | Edwards et al. |

(Continued)

FOREIGN PATENT DOCUMENTS

| | | |
|---|---|---|
| WO | WO2009144687 A2 | 12/2009 |
| WO | WO2013128346 A1 | 9/2013 |

(Continued)

OTHER PUBLICATIONS

Extended European Search Report issued by the European Patent Office, Munich, Germany, dated Jan. 30, 2019, for European Patent Application No. 1816567.6; 8 pages.

*Primary Examiner* — Phung Nguyen
(74) *Attorney, Agent, or Firm* — Faegre Baker Daniels LLP

(57) ABSTRACT

A child car seat is provided, comprising a base; a seat coupled to the base; and a sensor device mounted to the base or the seat, the sensor device including a sensor that outputs a measurement signal indicating whether a child is present in the seat, a processor that receives the measurement signal and determines whether a child is present, and a communication circuit that transmits a proximity signal configured for reception by a first mobile device. The proximity signal causes a first alert to be communicated to the first mobile device in response to the first mobile device exceeding a range from the sensor device, and a second alert to be communicated to a second mobile device if, after a threshold amount of time, the measurement signal continues to indicate that a child is present and no response is received in response to the first alert.

15 Claims, 10 Drawing Sheets

(56) References Cited

U.S. PATENT DOCUMENTS

| | | |
|---|---|---|
| 6,768,420 B2 | 7/2004 | McCarthy et al. |
| 6,809,643 B1 | 10/2004 | Elrod et al. |
| 6,847,302 B2 | 1/2005 | Flanagan et al. |
| 6,922,147 B1 | 7/2005 | Viksnins et al. |
| 6,922,622 B2 * | 7/2005 | Dulin .................. B06B 1/0215 180/272 |
| 6,924,742 B2 | 8/2005 | Mesina |
| 6,924,842 B2 | 8/2005 | Yahagi |
| 7,009,522 B2 | 3/2006 | Flanagan et al. |
| 7,012,533 B2 | 3/2006 | Younse |
| 7,097,226 B2 | 8/2006 | Bingle et al. |
| 7,319,382 B1 | 1/2008 | Vu |
| 7,321,306 B2 | 1/2008 | Lee et al. |
| 7,408,445 B1 | 8/2008 | Cunningham |
| 7,466,217 B1 | 12/2008 | Johnson et al. |
| 7,663,493 B2 | 2/2010 | Monzo et al. |
| 7,710,277 B2 | 5/2010 | Wilson |
| 7,714,737 B1 | 5/2010 | Morningstar |
| 7,796,021 B2 | 9/2010 | Saban |
| 7,812,716 B1 * | 10/2010 | Cotter .................. B60Q 1/50 340/457.1 |
| 7,908,777 B1 | 3/2011 | Beardsley |
| 7,969,316 B2 | 6/2011 | Stumpf et al. |
| 8,014,789 B2 | 9/2011 | Breed |
| 8,035,508 B2 | 10/2011 | Breed |
| 8,038,213 B2 | 10/2011 | Owens |
| 8,058,983 B1 | 11/2011 | Davisson et al. |
| 8,063,788 B1 | 11/2011 | Morningstar |
| 8,169,311 B1 | 5/2012 | Breed |
| 8,179,274 B2 | 5/2012 | Rork et al. |
| 8,212,665 B2 | 7/2012 | Schoenberg et al. |
| 8,217,796 B2 | 7/2012 | Trummer |
| 8,232,874 B1 | 7/2012 | Aneiros et al. |
| 8,410,945 B2 | 4/2013 | Breed |
| 8,655,547 B1 | 2/2014 | Steele |
| 8,659,414 B1 | 2/2014 | Schuk |
| 8,768,292 B2 | 7/2014 | Welch |
| 8,816,845 B2 * | 8/2014 | Hoover .................. B60N 2/28 340/539.11 |
| 8,841,997 B2 | 9/2014 | Silveira |
| 8,948,442 B2 | 2/2015 | Breed et al. |
| 8,967,717 B2 | 3/2015 | Sims |
| 8,970,362 B2 | 3/2015 | Morley et al. |
| 8,976,244 B2 | 3/2015 | Felt et al. |
| 9,000,906 B2 | 4/2015 | Chavez |
| 9,014,920 B1 | 4/2015 | Torres et al. |
| 9,139,128 B1 | 9/2015 | Lemons |
| 9,187,013 B2 | 11/2015 | Helm |
| 9,189,943 B1 | 11/2015 | Rambadt et al. |
| 9,227,484 B1 | 1/2016 | Justice et al. |
| 9,266,535 B2 | 2/2016 | Schoenberg |
| 9,290,146 B2 | 3/2016 | Breed |
| 9,550,454 B1 * | 1/2017 | Roisen .................. G08B 21/24 |
| 2003/0122662 A1 | 7/2003 | Quinonez |
| 2004/0210360 A1 * | 10/2004 | Dietz .................. G07C 5/006 701/33.4 |
| 2006/0103516 A1 | 5/2006 | Zang |
| 2007/0222622 A1 | 9/2007 | Sweeney |
| 2008/0088441 A1 | 4/2008 | Breed |
| 2008/0161989 A1 | 7/2008 | Breed |
| 2008/0164990 A1 | 7/2008 | Anderson |
| 2009/0079557 A1 | 3/2009 | Miner |
| 2009/0234542 A1 | 9/2009 | Orlewski |
| 2009/0277190 A1 | 11/2009 | Piette |
| 2009/0295412 A1 | 12/2009 | Griffin |
| 2011/0080288 A1 | 4/2011 | Younse |
| 2011/0109450 A1 | 5/2011 | Hirschfeld et al. |
| 2011/0241867 A1 | 10/2011 | Neal |
| 2012/0154136 A1 | 6/2012 | Connelly, Jr. |
| 2012/0232749 A1 | 9/2012 | Schoenberg et al. |
| 2013/0021476 A1 | 1/2013 | Trummer |
| 2013/0033373 A1 | 2/2013 | Thomas |
| 2013/0049947 A1 | 2/2013 | Lanter |
| 2013/0194089 A1 | 8/2013 | Estrada |
| 2013/0201013 A1 | 8/2013 | Schoenberg |
| 2013/0250080 A1 | 9/2013 | Farrell et al. |
| 2014/0085070 A1 | 3/2014 | Schoenberg |
| 2014/0253314 A1 | 9/2014 | Rambald et al. |
| 2014/0292503 A1 | 10/2014 | Schoenberg |
| 2014/0300461 A1 | 10/2014 | Stark |
| 2014/0306838 A1 | 10/2014 | Beumler |
| 2014/0361889 A1 | 12/2014 | Wall, II et al. |
| 2015/0091348 A1 | 4/2015 | Juchniewicz et al. |
| 2015/0130604 A1 | 5/2015 | Gomez et al. |
| 2015/0137962 A1 | 5/2015 | Binnicker |
| 2015/0266395 A1 | 9/2015 | Bradley et al. |
| 2015/0274036 A1 | 10/2015 | Arad et al. |
| 2015/0274040 A1 | 10/2015 | Strumiska et al. |
| 2015/0286882 A1 | 10/2015 | Nicol |
| 2015/0332578 A1 | 11/2015 | Borgne et al. |
| 2016/0016520 A1 | 1/2016 | Meyer |
| 2016/0042616 A1 | 2/2016 | Dorsey |
| 2016/0042627 A1 | 2/2016 | Foley et al. |
| 2016/0049061 A1 | 2/2016 | Scarborough et al. |
| 2016/0078737 A1 * | 3/2016 | Cohen .................. G08B 21/0205 340/457 |
| 2016/0200250 A1 | 7/2016 | Westmoreland |
| 2016/0355157 A1 * | 12/2016 | Cech .................. B60R 22/48 |

FOREIGN PATENT DOCUMENTS

| | | |
|---|---|---|
| WO | WO2015060868 A1 | 4/2015 |
| WO | WO2015107485 A1 | 7/2015 |
| WO | WO2015118569 A1 | 8/2015 |
| WO | WO2015140333 A1 | 9/2015 |
| WO | WO2015160273 A1 | 10/2015 |
| WO | 2015193884 A1 | 12/2015 |

\* cited by examiner

CHILD ABANDONMENT MONITOR

RELATED APPLICATIONS

The present application is based on and claims priority to U.S. Provisional Application Ser. No. 62/403,960, filed Oct. 4, 2016, titled "SYSTEMS AND METHODS FOR REMOVABLE VEHICLE SEAT SENSOR," the entire disclosure of which being expressly incorporated herein by reference.

FIELD OF THE DISCLOSURE

The present disclosure generally relates to systems and methods for monitoring whether a child has been abandoned, and more specifically to a car seat system which alerts a caregiver when a child is left in the car seat and the caregiver has moved away from the car seat.

BACKGROUND

Small children (e.g., babies and infants) are normally unable to release themselves from the harness of a car seat. As such, small children secured in a car seat must depend on a caregiver to uncouple the car seat harness and remove them from the car seat, or to remove all or a portion of the car seat with the child still secured therein. Unfortunately, caregivers occasionally (intentionally or unintentionally) leave a child strapped in a car seat in the vehicle while the caregiver shops at a store or engages in some other activity. This may be fatal for the child, who may suffer from heat stroke and/or dehydration, or be abducted. Accordingly, it is highly desirable to provide a system that alerts the caregiver and/or others when a child remains strapped in a car seat and the caregiver moves an unacceptable distance away from the car seat containing the child.

Additionally, many consumer products such as car seats are occasionally the subject of product recalls or other safety-related communications. Conventional methods for communicating recall or other information to consumers rely on mass media and public notices. For products such as car seats, the information is generally not directly provided to the consumer, leaving the significant possibility that such information may never reach the affected consumers. Accordingly, there is a need to provide a registration and notification system for communicating information related to products such as car seats directly to the purchasers.

SUMMARY

According to one embodiment of the present disclosure, a child car seat is provided, comprising: a base configured to couple to a vehicle seat; a seat configured to couple to the base; and a sensor device mounted to one of the base or the seat, the sensor device including a sensor that outputs a measurement signal indicating whether a child is present in the seat, a processor configured to receive the measurement signal and to determine, based on the measurement signal, whether a child is present in the seat, and a communication circuit controlled by the processor, the communication circuit transmitting a proximity signal in response to the processor determining that a child is present in the seat, the proximity signal being configured for reception by a first mobile device; wherein the proximity signal causes a first alert to be communicated to a user of a first mobile device in response to the first mobile device exceeding a range from the sensor device; and wherein a second alert is communicated to the user of a second mobile device if, after a threshold amount of time, the measurement signal continues to indicate that a child is present in the seat and no response is received by the sensor device in response to the first alert. In one aspect of this embodiment, a third alert is communicated to an emergency service if, after a second threshold amount of time, the measurement signal continues to indicate that a child is present in the seat and no response is received by the sensor device in response to either the first alert or the second alert. In another aspect, the sensor device is mounted to the base. In yet another aspect, the seat comprises a harness having a chest clip, the sensor device being housed in the chest clip. In a variant of this aspect, the chest clip comprises a tongue and a buckle, the sensor device being housed within a housing of the tongue. Another aspect of this embodiment further comprises an indicator on at least one of the base and the seat, the indicator being detectable by the first mobile device, wherein detection of the indicator causes the first mobile device to obtain software that provides for linking the first mobile device to the sensor device. In a variant of this aspect, linking the first mobile device to the sensor device provides for the first mobile device to receive safety information from a manufacturer of the car seat. In another aspect, the sensor device is programmed to transmit an alert to a vehicle alarm system to generate a vehicle alarm. In still another aspect, the sensor device is configured to receive an environmental measurement and reduce the threshold amount of time in response to the environmental measurement exceeding a maximum value. In a variant of this aspect, the environmental measurement is at least one of a humidity measurement and a temperature measurement. In another aspect, the communication circuit is configured to communicate based on a wireless communication standard. In a variant of this aspect, the wireless communication standard is based on at least one of a BTLE standard, an IEEE 802.15.1 standard, and an IEEE 802.15.4 standard.

In another embodiment, the present disclosure provides a method for child car seat proximity detection executing on a specifically programmed processor coupled to the child car seat, comprising: generating a proximity indication representative of a proximity of a first mobile device to the child car seat; determining, based on the proximity indication, that the first mobile device has exceeded a threshold range from the child car seat; generating a first abandonment alert indicating that the first mobile device has exceeded the threshold range from the child car seat; communicating the first abandonment alert to the first mobile device; determining that a first threshold amount of time, during which the first mobile device continues to exceed the threshold range from the child car seat, has passed without a response from the first mobile device; and responding to a determination that the first threshold amount of time, during which the first mobile device continues to exceed the threshold range from the child car seat, has passed without a response from the first mobile device by communicating a second abandonment alert to a second mobile device. In one aspect of this embodiment, the method further comprises determining that a second threshold amount of time, during which the first mobile device continues to exceed the threshold range from the child car seat, has passed without a response from either the first mobile device or the second mobile device; and responding to a determination that the second threshold amount of time, during which the first mobile device continues to exceed the threshold range from the child car seat, has passed without a response from either the first mobile device or the second mobile device by communicating a third abandonment alert to an emergency service. Another aspect further comprises responding to a determination that the first threshold amount of time, during which the first mobile device continues to exceed the threshold range from the child car seat, has passed without a response from the first mobile device by generating an alert to a vehicle alarm system to generate a vehicle alarm. In another aspect, the proximity indication includes a received signal strength indicator (RSSI). In yet another aspect, the method further comprises: generating an environmental measurement representative of an environmental condition via an environmental sensor; determining that the environmental measurement exceeds a maximum environmental measurement safety threshold; and responding to a determination that the environmental measurement exceeds the maximum environmental measurement safety threshold by reducing the first threshold amount of time. In a variant of this aspect, the environmental measurement is at least one of a humidity measurement and a temperature measurement.

In yet another embodiment, the present disclosure provides a system for preventing abandonment of a child in a vehicle car seat, comprising: a car seat having a harness with a chest clip housing a sensor device, the sensor device being configured to detect the presence of a child in the car seat; and a mobile device in communication with the sensor device; wherein the sensor device responds to detecting the presence of a child in the car seat by transmitting a proximity signal to the mobile device; and wherein the mobile device generates, based on the proximity signal, a first alert when the mobile device exceeds a first range of the sensor device and generates, based on the proximity signal, a second alert when the mobile device exceeds a second range of the sensor device. In one aspect of this embodiment, the mobile device generates the first alert and the second alert based on a signal strength of the proximity signal.

BRIEF DESCRIPTION OF THE DRAWINGS

The above-mentioned aspects of the present teachings and the manner of obtaining them will become more apparent, and the teachings will be better understood by reference to the following description of the embodiments taken in conjunction with the accompanying drawings, wherein.

DETAILED DESCRIPTION OF EMBODIMENTS OF THE DISCLOSURE

In the following description, reference is made to the accompanying drawings that form a part hereof, and in which are shown by way of illustration specific embodiments that may be practiced. These embodiments are described in sufficient detail to enable those skilled in the art to practice the invention, and it is to be understood that other embodiments may be used and that structural, logical, and electrical changes may be made without departing from the scope of the present invention as recited in the claims. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of non-transitory storage device. Further, such functions correspond to specifically programmed modules, which are software, hardware, firmware, or any combination thereof. Multiple functions may be performed in one or more modules as desired, and the embodiments described are merely examples. The software may be executed on a digital signal processor, ASIC, microprocessor, or other type of specifically programmed processor operating on a computer system, such as a personal computer, server, or other computer system. Described herein are methods and systems for detecting the presence of a child and alerting a caregiver of certain conditions, including information related to the product.

Figure 1:
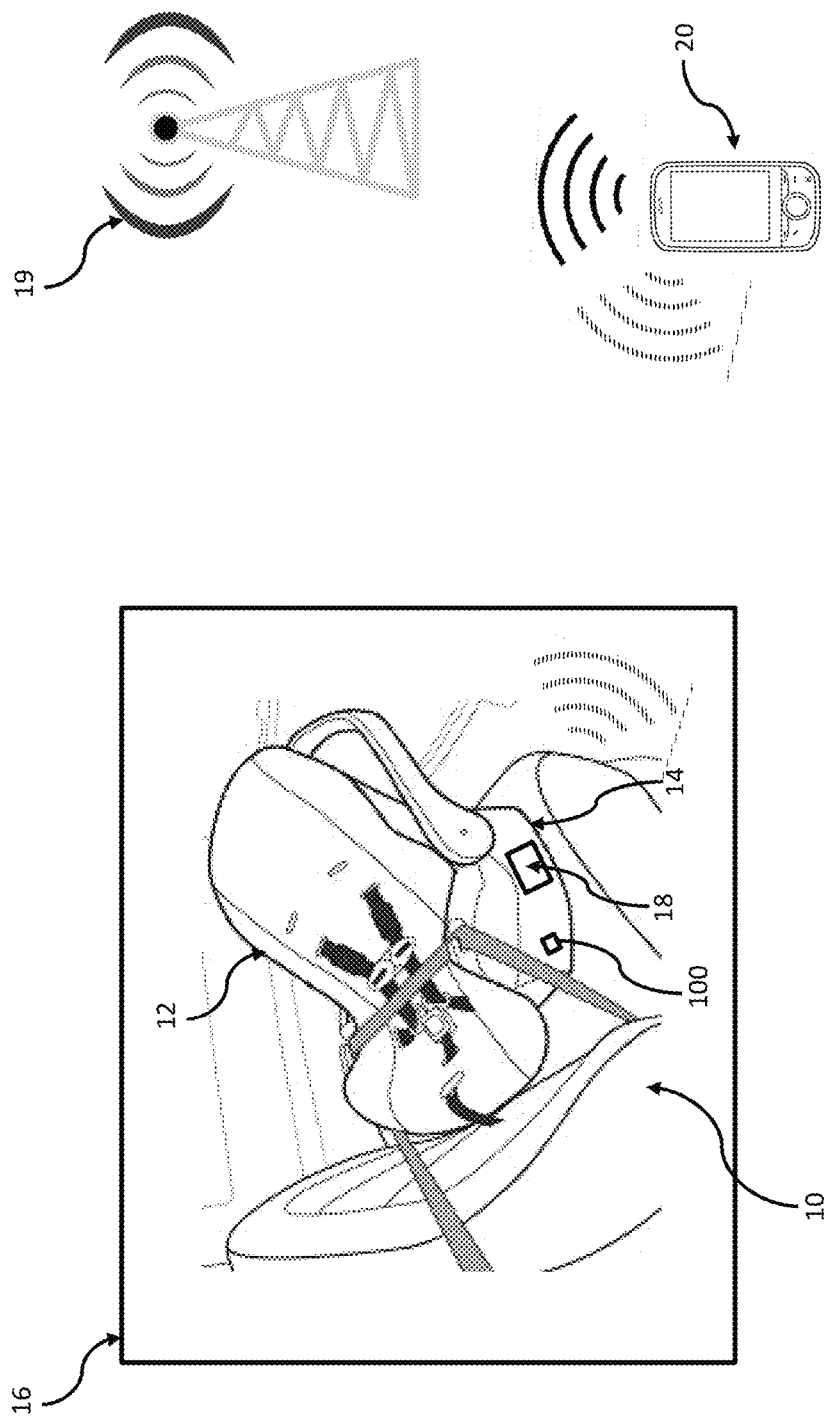
FIG. 1 is a perspective view of a removable vehicle seat detection system, according to some embodiments.

FIG. 1 is a perspective view of an embodiment of a child vehicle seat system 10. System 10 includes a removable seat 12 and seat base 14. Base 14 is installed in the vehicle 16 and may remain in vehicle 16 at the user's preference. Removable seat 12 securely fastens to base 14, and seat 12 may be removed from vehicle 16 without removing a child from seat 12. System 10 in certain embodiments includes a sensor device 18 which may be integral in base 14 or attached to base 14. Other embodiments are envisioned where sensor device 18 is separate from base 14. Such embodiments may have a sensor device in vehicle 16 generally, in removable seat 12, and/or otherwise.

When used in removable vehicle seats, such as those designed for children, sensor device 18 operates to determine if a child is within vehicle 16. In one embodiment, sensor device 18 includes a sensor 21 such as a magnetic detection sensor, such as a Hall Effect sensor that outputs a voltage in response to a magnetic field which may be different with a child present than with the child absent. In one example, sensor device 18 generates a binary proximity signal to indicate whether seat 12 is in sufficiently close proximity to base 14, such as comparing a Hall Effect sensor voltage against a minimum voltage threshold. In other examples, sensor 21 is a load cell that measures weight. In some examples, seat 12 must be snapped into or otherwise connected to base 14 for sensor 21 to provide a signal indicating that seat 12 is in sufficiently close proximity to base 14. The proximity signal may be used to determine if removable seat 12 has been separated from base 14, which may be used by system 10 to infer that a child in seat 12 is no longer within vehicle 16. In one embodiment, sensor 21 may include a magnetic reed switch that opens when seat 12 is removed from base 14. It should be understood that in various embodiments, sensor 21 may be used to determine if seat 12 is in close proximity to base 14 and/or to determine if a child is in close proximity to seat 12 and/or base 14.

In certain embodiments, sensor 21 may include a capacitive sensor, Doppler Effect sensor, eddy-current sensor, inductive sensor, laser rangefinder sensor, magnetic sensor, optical sensor, thermal infrared sensor, photocell sensor, radar sensor, ionizing radiation reflection sensor, sonar sensor, ultrasonic sensor, fiber optics sensor, or another proximity sensor.

Figure 2:
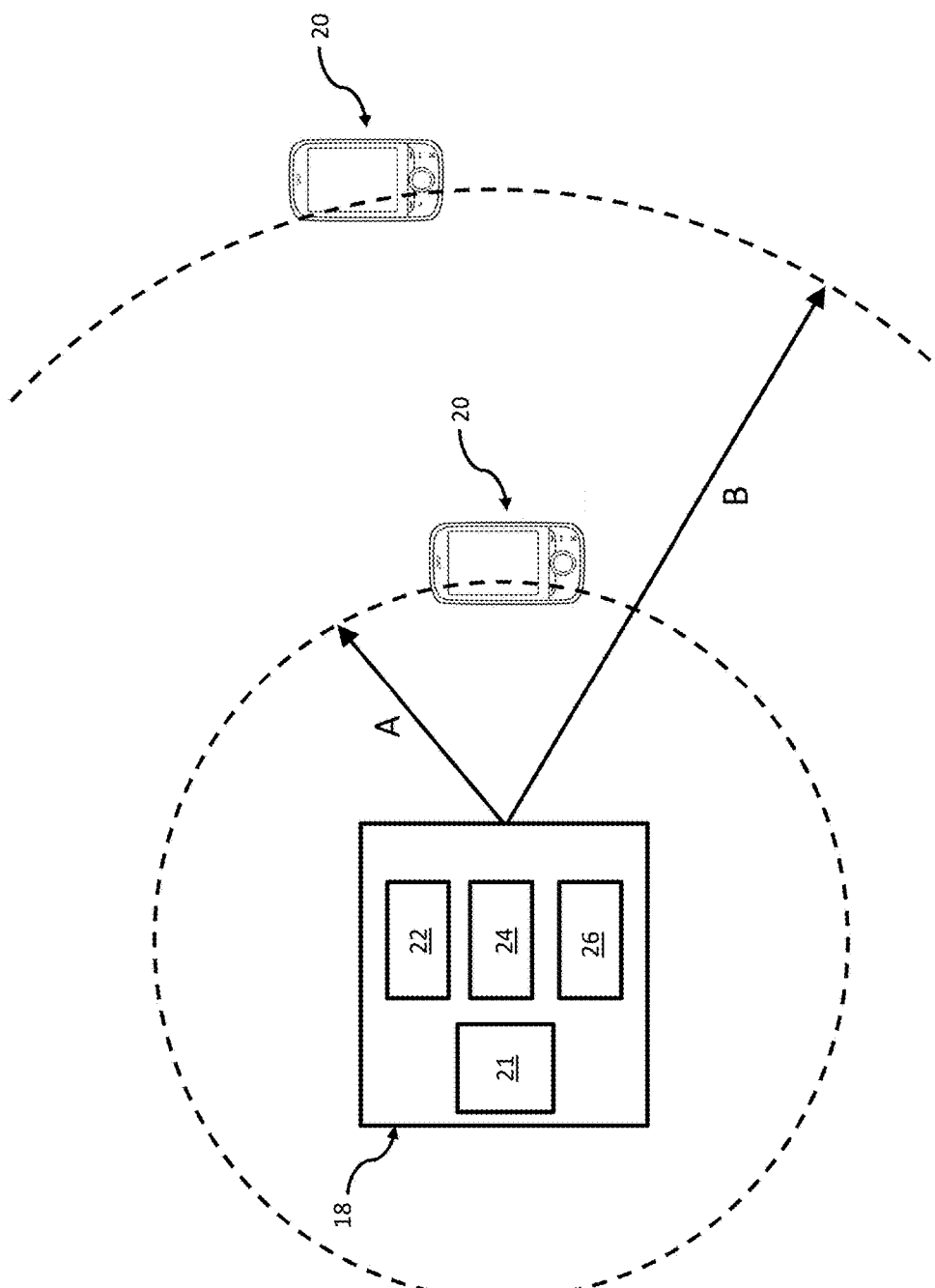
FIG. 2 is a conceptual diagram of a sensing device in communication with mobile devices.

As shown in FIG. 2, sensor device 18 generally includes a sensor 21, a processor 22, an RF communication circuit 24 and a power source 26. In various examples, sensor device 18, via the RF circuit 24, transmits proximity signals to mobile electronic device 20, to a vehicle computer system, or to another device such as cell tower 19 (FIG. 1). RF circuit 24 may transmit signals in accordance with a low power wireless transmission standard, such as Bluetooth Low Energy (BTLE), IEEE 802.15.1, IEEE 802.15.4, or other standards. The RF circuit 24 may be paired with one or more mobile electronic device 20 and/or with vehicle 16 to establish such communications.

In some embodiments, sensor device 18 receives a raw sensor measurement from sensor 21, interprets the raw measurement as an indication of whether seat 12 and/or a child in seat 12 is present in vehicle, formats the interpreted data, and transmits the formatted data. For example, a sensor measurement may include a voltage level received from a Hall Effect sensor, and the voltage level may be compared against a voltage threshold to generate a binary magnetic proximity signal indicating that seat 12 is securely fastened within vehicle 16. In other embodiments, sensor device 18 receives and transmits the raw measurement to device 20, and device 20 interprets the raw measurement. In still other embodiments, sensor device 18 receives and interprets the raw measurement, and transmits both the raw measurement and the interpreted measurement to device 20. The raw and interpreted measurements may be received by processor 22 and converted into a data format that is compatible with the target device, such as using a data format compatible with an application running on mobile device 20 or a data format compatible with a vehicle computer system.

Referring again to FIG. 2, a system is shown depicting sensor device 18 communicating with a mobile device 20 shown in two different positions. In this example, when sensor device 18 determines that seat 12 remains attached to base 14 (or otherwise infers or directly measures the presence of a child in vehicle 16) and mobile device 20 moves away from sensor device 18, sensor device 18 may communicate a signal to mobile device 20. Mobile device 20 may evaluate the signal based on its strength as is further described herein. The distance "A" shown in FIG. 2 represents a strength of the signal from sensor device 18 falling below a first threshold. For example, when the signal strength falls below the first threshold, mobile device 20 may be 1 to 2 feet from sensor device 18. This may result in a first notification to the user of mobile device 20 reminding the user not to leave a child in seat 12. The first notification may be a relatively subtle reminder that the child is in seat 12 (e.g., a vibration on mobile device 20). When mobile device 20 is moved farther from sensor device 18, the strength of the signal received by mobile device 20 from sensor device 18 may drop below a second threshold. For example, when the signal strength drops below the second threshold, the mobile device may be distance "B" from sensor device (e.g., 30-50 feet). This may result in a second, more urgent notification to the user of mobile device 20 reminding the user not to leave a child in seat 12. More or fewer than two thresholds may be used, and the strength of the signal emitted by sensor device 18 may be enhanced in some embodiments using an RF power amplifier.

In other embodiments, mobile device 20 may determine when it no longer receives a signal from sensor device 18 (i.e., it is out of range of sensor device 18). When this occurs, mobile device 20 may generate a notification to the user indicating that a signal was received from sensor device 18 (indicating that a child remains in seat 12), and mobile device 20 has moved too far from sensor device 18. The user is thus reminded to return to the child. In other embodiments, GPS may be used to determine the relative locations of sensor device 18 and mobile device 20. When mobile device 20 receives a signal from sensor device 18 and then moves (as determined by the GPS system) an unacceptable distance from sensor device 18, mobile device 20 may generate a notification to the user prompting the user to return to the child. Other location systems such as cellular tower triangulation or Wi-Fi access point triangulation may be used.

The notification to the user may include a visible alert, an audible alert, a tactile alert (e.g., vibration), a text or e-mail message, or other alert. In some examples, mobile device 20 may include a mobile device processor, where the processor is executing foreground or background software to generate a visible or audible alarm, and mobile device 20 may include speakers or other hardware or circuitry to generate the alarm. In some examples, sensor device 18, seat 12, base 14 and/or vehicle 16 may generate an alarm instead of or in addition to the notification generated by mobile device 20. Seat 12, base 14 or sensor device 18 may generate the alarm using internal alarm circuitry or cause vehicle 16 to generate the alarm by sending a signal to a vehicle alarm system. One or more alarms may be used in combination to increase the probability that a user is notified.

It should be understood that in various embodiments, sensor device 18 may detect the proximity of mobile device 20, mobile device 20 may detect the proximity of sensor device 18, or both devices may detect the proximity of the other. In response to a determination by either device (or both) that the relative proximity is unacceptable (via signal strength analysis or otherwise), coupled with a determination by sensor device 18 that a child remains in vehicle 16, either mobile device 20 or sensor device 18 (or both) may generate the notifications described above. Additionally, sensor device 18 may communicate with vehicle 16 to cause vehicle 16 to generate a notification.

The above-described system may use various features of vehicle 16. A vehicle alarm system may be used to notify the user, such as honking the horn or flashing lights to indicate an abandonment alert. A vehicle equipped with a roadside emergency service system may contact the service to request help or to initiate a phone call with an operator (via cell tower 19) to determine if a child is within vehicle 16. Vehicle 16 may also provide an indication of vehicle speed or movement, and sensor device 18 may enter a reduced power (e.g., sleep) mode when vehicle 16 is moving to extend the useful life of power source 26. Vehicle 16 may also provide an environmental response to an abandonment alert, such as opening car windows or turning on air conditioning. Vehicle 16 may also provide an environmental input, such as temperature, humidity, or other environmental measurement, using environmental sensors as described below.

Figure 3:
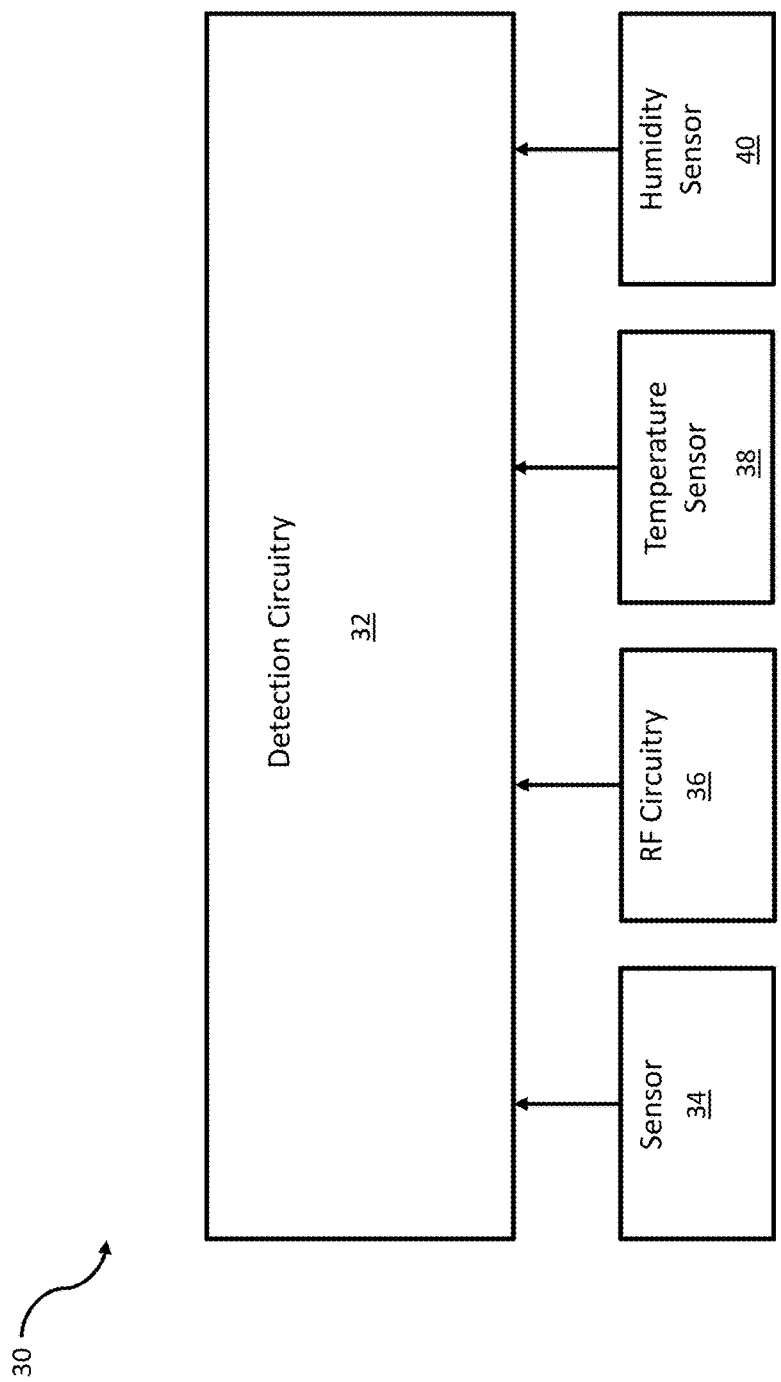
FIG. 3 is a block diagram of an example child detection system, according to some embodiments.

Referring now to FIG. 3, a block diagram of a detection system 30 is shown. System 30 includes detection circuitry 32, where detection circuitry 32 may include sensor device 18, a mobile device processor, a dedicated integrated circuit (IC), or other circuit. Detection circuitry 32 may receive magnetic proximity signals from a sensor 34. Detection circuitry 32 may receive RF proximity signals from RF circuitry 36, where the RF proximity signals indicate RF proximity between the RF proximity sensor 36 and a mobile device 20. Detection circuitry 32 may also use RF circuitry 36 to communicate with mobile device 20, including sending or receiving notifications, alerts or proximity information.

Detection circuitry 32 may also receive various other inputs, such as an input from a temperature sensor 38 or from a humidity sensor 40. Detection circuitry 32 may combine inputs from various sensors to generate various alerts. For example, detection circuitry 32 may use a sensor 34 input to determine that a removable vehicle seat is within a vehicle, and may warn a user when the temperature sensor 38 and humidity sensor 40 indicate an unsafe environment within vehicle 16.

Components of the removable seat proximity detection circuitry 32 may be implemented on two or more devices. In an example, a removable vehicle seat may be manufactured to include a detectable element, and a removable vehicle seat base may be manufactured to include the detection circuitry 32, sensor 34, RF circuitry 36, temperature sensor 38, and humidity sensor 40 or a subset of the same. In other embodiments, RF circuitry 36, temperature sensor 38, or humidity sensor 40 may be implemented in a mobile device 20, in vehicle 16, or in another device.

Figure 4:
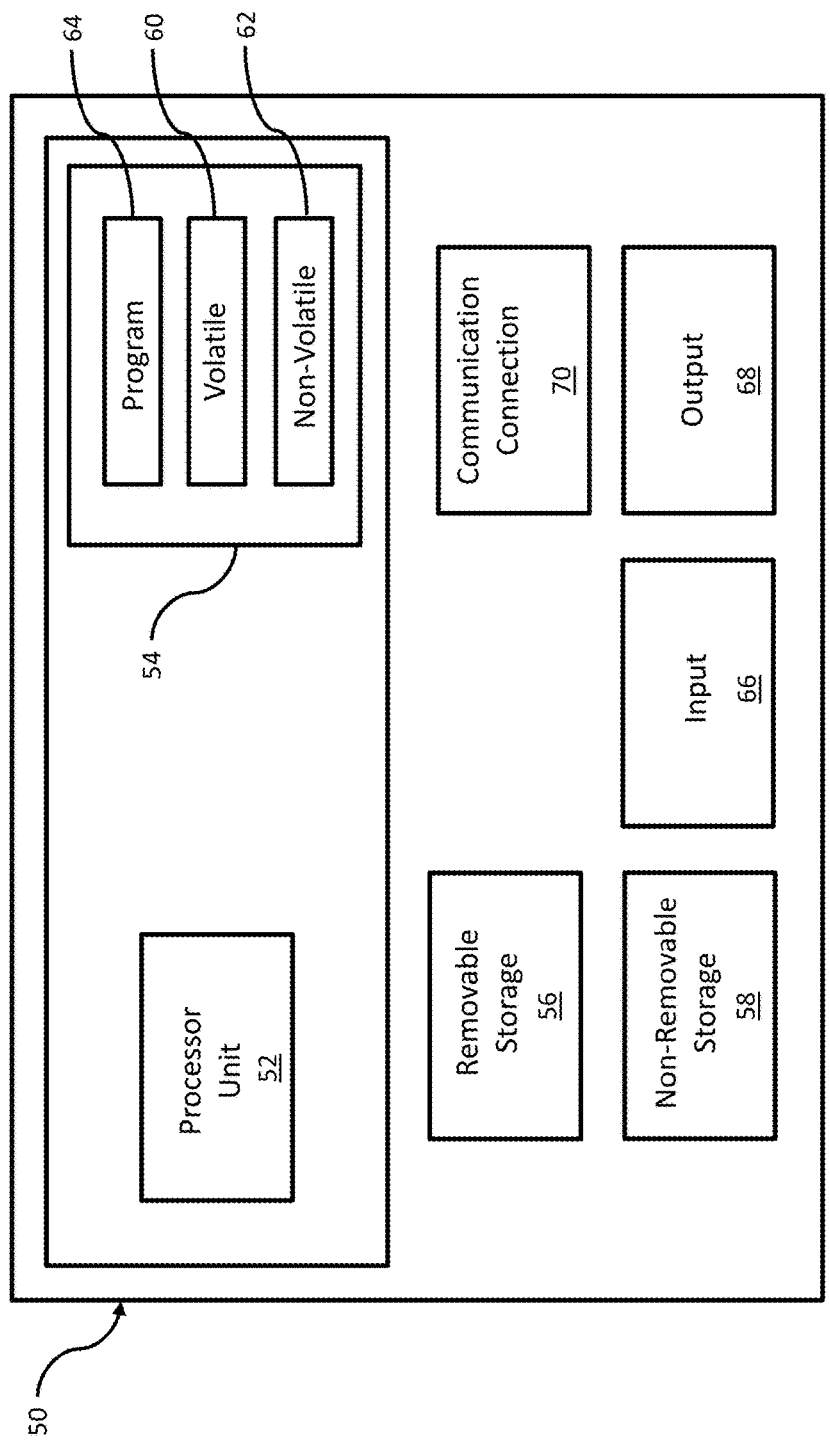
FIG. 4 is a block diagram of a computer system to implement the child detection system, according to some embodiments.

FIG. 4 is a block diagram of a computer system 50 to implement removable seat detection system 30, according to some embodiments. Computer system 50 may use fewer or more components than shown in FIG. 4 in some embodiments to perform the methods described. One example computing device in the form of computer 50, may include a processing unit 52, memory 54, removable storage 56, and non-removable storage 58. Memory 54 may include volatile memory 60 and non-volatile memory 62 and one or more programs 64. Computer 50 may include or have access to a computing environment that includes a variety of computer-readable media, such as volatile memory 60 and non-volatile memory 62, removable storage 56 and non-removable storage 58. Computer storage includes random access memory (RAM), read only memory (ROM), erasable programmable read-only memory (EPROM), electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Computer 50 may include or have access to a computing environment that includes input 66, output 68, and a communication connection 70. Computer 50 may operate in a networked environment using communication connection 70 to connect to one or more remote computers, such as database servers. The remote computer may include a personal computer (PC), server, router, network PC, a peer device or other common network node, or the like. Communication connection 70 may include a Local Area Network (LAN), a Wide Area Network (WAN) or other networks.

Computer-readable instructions stored on a computer-readable medium are executable by processor unit 52 of computer 50. A hard drive, CD-ROM, and RAM are some examples of articles including a non-transitory computer-readable medium. For example, a computer program 64 capable of providing a generic technique to perform access control check for data access and/or for doing an operation on one of the servers in a component object model (COM) based system may be included on a CD-ROM and loaded from the CD-ROM to a hard drive. The computer-readable instructions allow computer 50 to provide generic access controls in a COM based computer network system having multiple users and servers.

Referring back to FIG. 2, RF circuit 24 of sensor device 18 may be paired with one or more of mobile devices 20. In one embodiment, multiple mobile devices 20 are paired with RF circuit 24 of sensor device 18. The ability to communicate with multiple devices allows for escalation of alerts. By way of example, first mobile device 20 could be associated with a primary caregiver and second mobile device 20 could be associated with a secondary caregiver.

Figure 5:
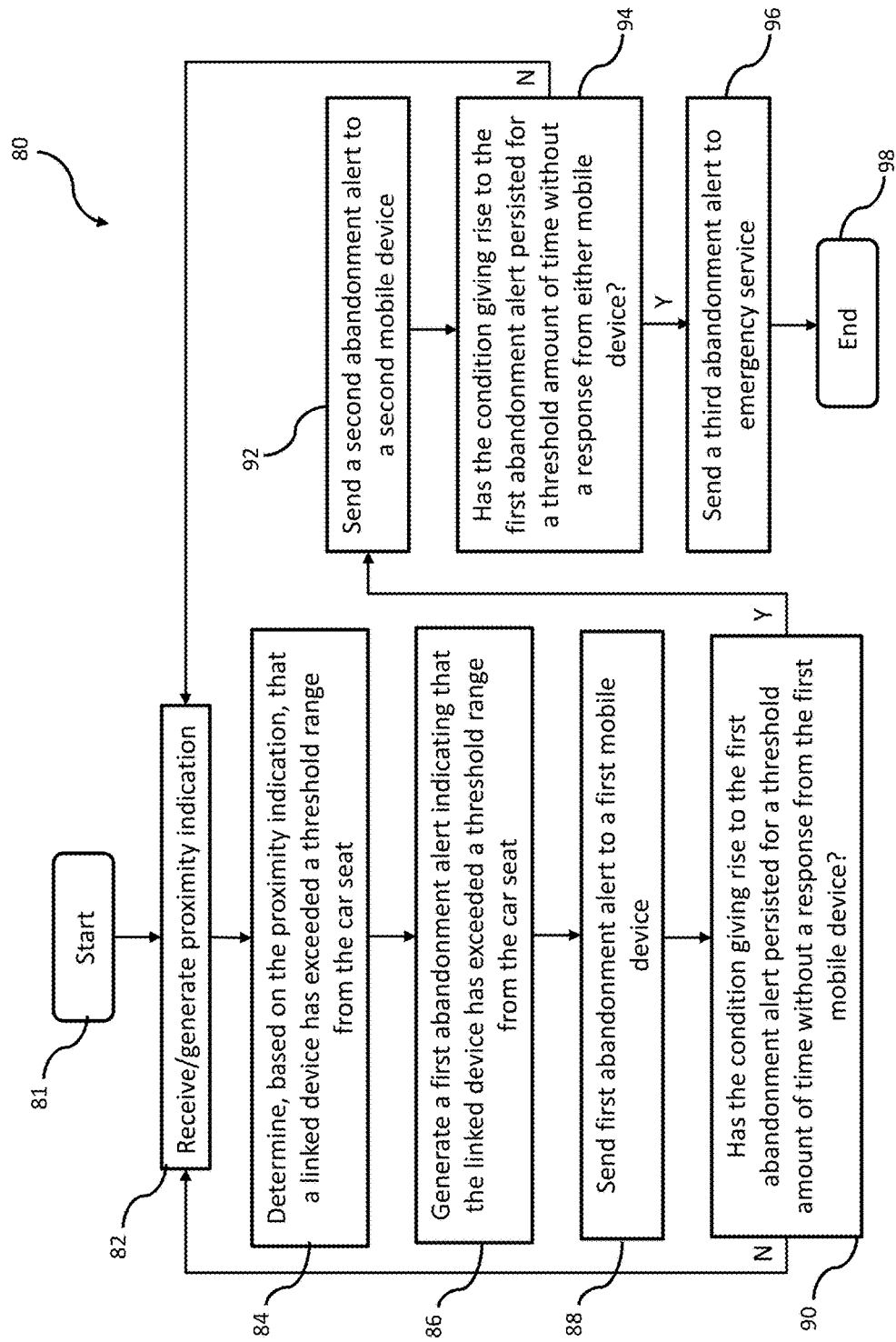
FIG. 5 is a flowchart of an alert escalation method, according to some embodiments.

Referring now to FIG. 5, in the example described above and according to one method 80 of the present disclosure which starts at block 81, upon receiving a proximity indication, block 82, and determining based thereon that a linked device has exceeded a threshold range from the car seat, block 84, any alert(s) or signal(s) received or generated by the system, block 86, are first sent to mobile device 20 associated with the primary caregiver, block 88. If no response is detected from the primary caregiver and/or the condition giving rise to the alert/signal persists for a threshold amount of time, block 90, the method 80 proceeds to send an alert/signal to a mobile device 20 associated with a secondary caregiver, block 92, thereby escalating the alert. If the condition does not persist or the time threshold is not exceeded, control is returned to block 82. The above-mentioned alert/signals may take the form of a phone call, a text message, or any other indicia being provided to a mobile device 20.

In the event that no response continues to be detected from either the primary or the secondary caregiver and the condition giving rise to the alert/signal persists for another threshold amount of time, block 94, the method 80 may send a signal to an emergency service or public safety officials, block 96, such as by dialing 911 or sending a text to 911. Otherwise, control is returned to block 82. Such contact with public safety officials illustratively provides information that can be used to locate the vehicle/car seat. In one example, a message to public safety officials includes a description of the car, the nature of the conditions giving rise to the alert, and/or GPS coordinates of the car. In each described case, the method 80 illustratively includes a timer and preset or adjustable timing is set for when each additional level of contact (primary caregiver, secondary caregiver, public safety) is to be implemented. Still further, such timing can be impacted based on other sensors present. By way of example, the detection of an elevated temperature within the vehicle can be used to lessen the time threshold between one level of contact and another. The method 80 ends at block 98.

Referring back to FIG. 1, at least one of seat 12 and base 14 may include one or more indicator 100 thereon. Illustratively, the indicator is a bar code, QR code, or other such indicia that can be interpreted by a computing device. In another embodiment, the indicator is an RFID chip that is able to be detected by mobile device 20. By scanning the indicator, such as via a camera or RF reader within mobile device 20, the mobile device 20 is directed to obtain software (such as an application) to run on mobile device 20. In addition to an application suitable for running on mobile device 20, such indicator may direct a browser on mobile device 20 to a user manual for the system and/or installation instructions. Still further, in one example, indicator 100 is provided so that when interpreted by mobile device 20 (such as by an application running thereon) mobile device 20 is paired with at least one of seat 12 and base 14 on which indicator 100 is located such that any alerts issued related thereto are sent to mobile device 20. In such a manner, indicator 100 serves to link mobile device 20 to the system.

In yet another example, scanning indicator 100 on at least one of seat 12 and base 14 causes a warranty form or other form to auto-populate with product information such as a model number and/or serial number such that a user can easily register their product purchase. Still further, such scanning of indicator 100 can register the at least one of seat 12 and base 14 and allow a manufacturer to link such at least one of seat 12 and base 14 with mobile device 20 scanning the indicator 100. As such, any notices relevant to the system can be sent to mobile device 20. Examples of such notices include safety reminders and recall notices.

Figure 6:
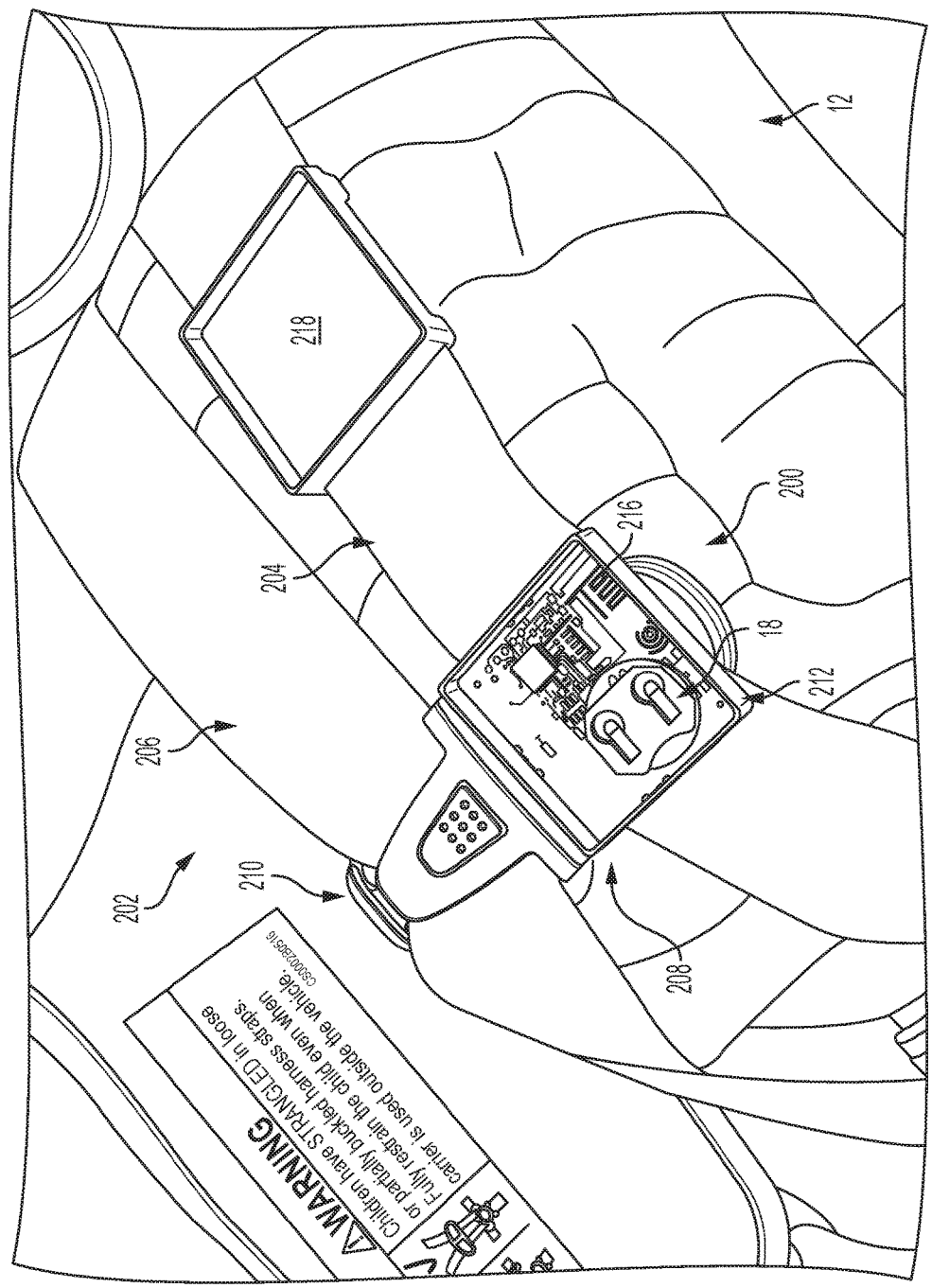
FIG. 6 is a perspective view of a chest clip having a sensing device according to another embodiment of the disclosure.

Now referring to FIGS. 6-10, another embodiment of a sensor device is shown. In this embodiment, sensor device 18 is integrated into a chest clip 200 of a child restraint harness 202. As shown in FIG. 6, harness 202 generally includes a first webbing 204, a second webbing 206 and chest clip 200 including sensor device 18. First webbing 204 and second webbing 206 are coupled to car seat 12 in a conventional manner (i.e., one end of each webbing passes through seat 12 above the shoulders of the child and another end of each webbing connects to a coupling mechanism between the child's legs). Webbings 204, 206 are coupled together at a location near the chest of the child by chest clip 200. Chest clip 200 generally includes a tongue 208 which slides onto webbing 204 and a buckle 210 which slides onto webbing 206. Tongue 208 generally includes a housing 212 and an extension 214 (FIG. 7) that projects from one side of housing 212. Housing 212 includes a circuit board 216 that includes the processor 22, transmitter/receiver 24 and power supply 26 discussed above. Tongue 208 further includes a cover 218 configured to slide onto housing 212 and protect circuit board 216.

Figure 7:
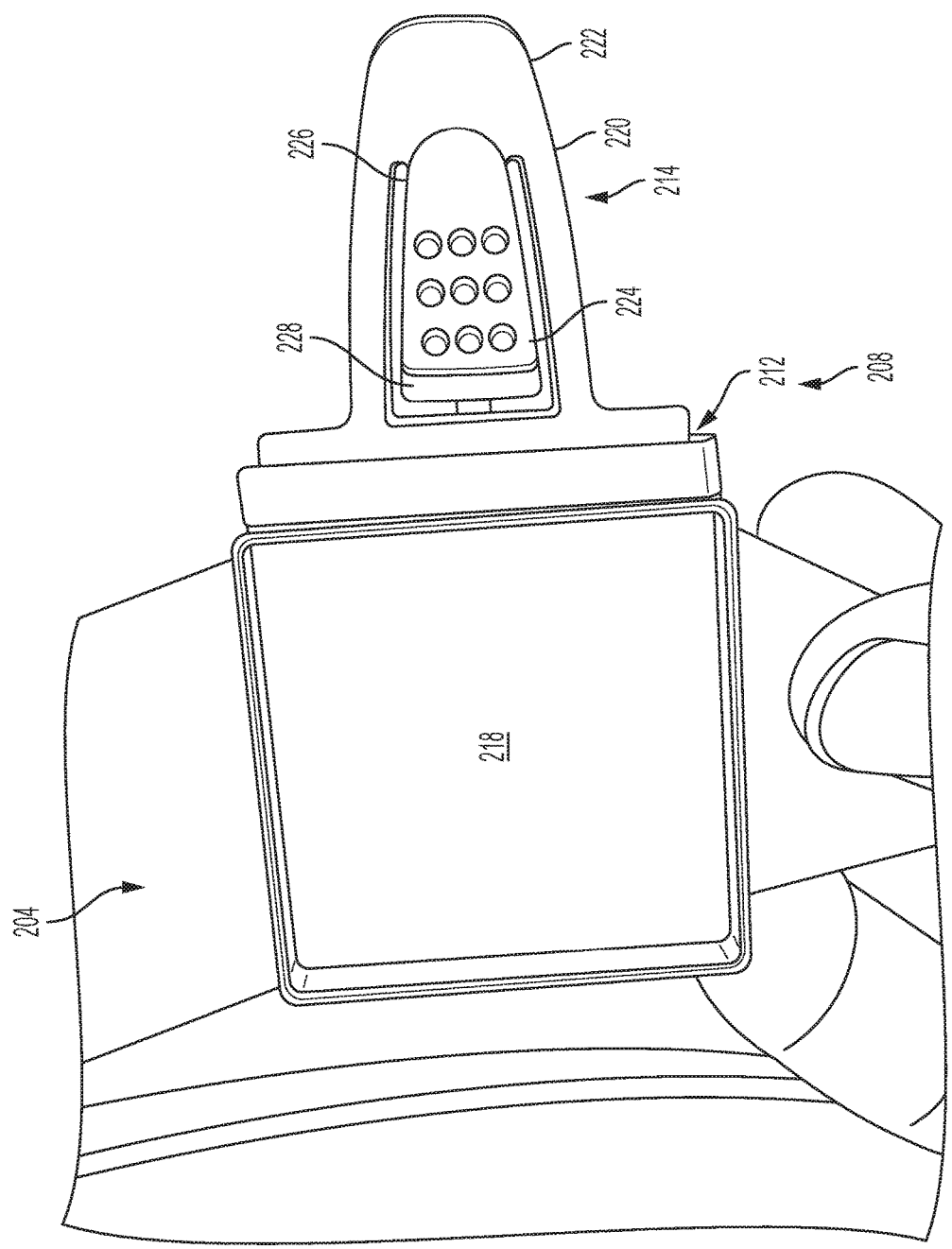
FIG. 7 is a top view of a latch of the chest clip of FIG. 6.
Figure 8:
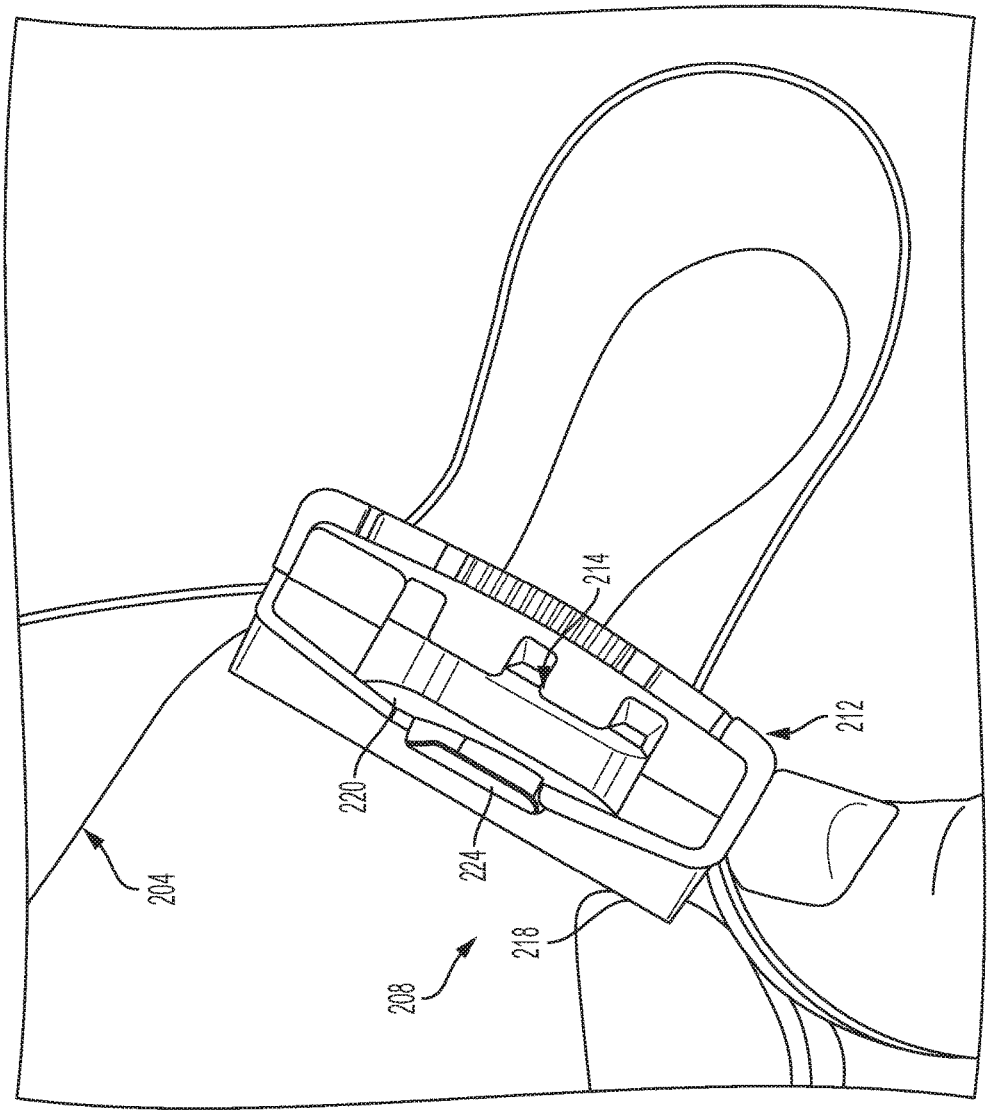
FIG. 8 is an end view of the latch of FIG. 7.
Figure 9:
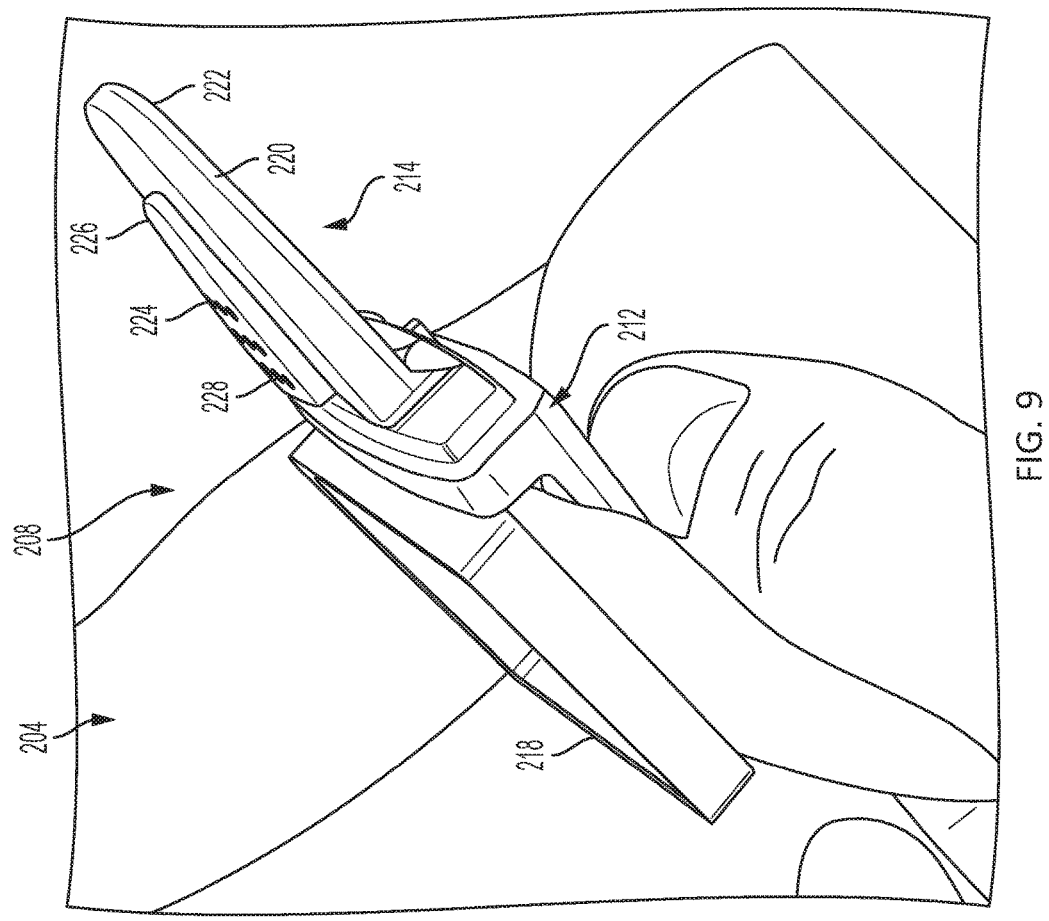
FIG. 9 is a side view of the latch of FIG. 7.

As best shown in FIG. 7, extension 214 of tongue 208 includes a body 220 that tapers from housing 212 to a distal end 222 of body 220. Depending from distal end 222 of body 220 is a latch 224 having a proximal end 226 and a distal end 228. As best shown in FIGS. 8 and 9, latch 224 extends above the main plane of extension 214 and inclines away from body 220 with distance from proximal end 226.

Figure 10:
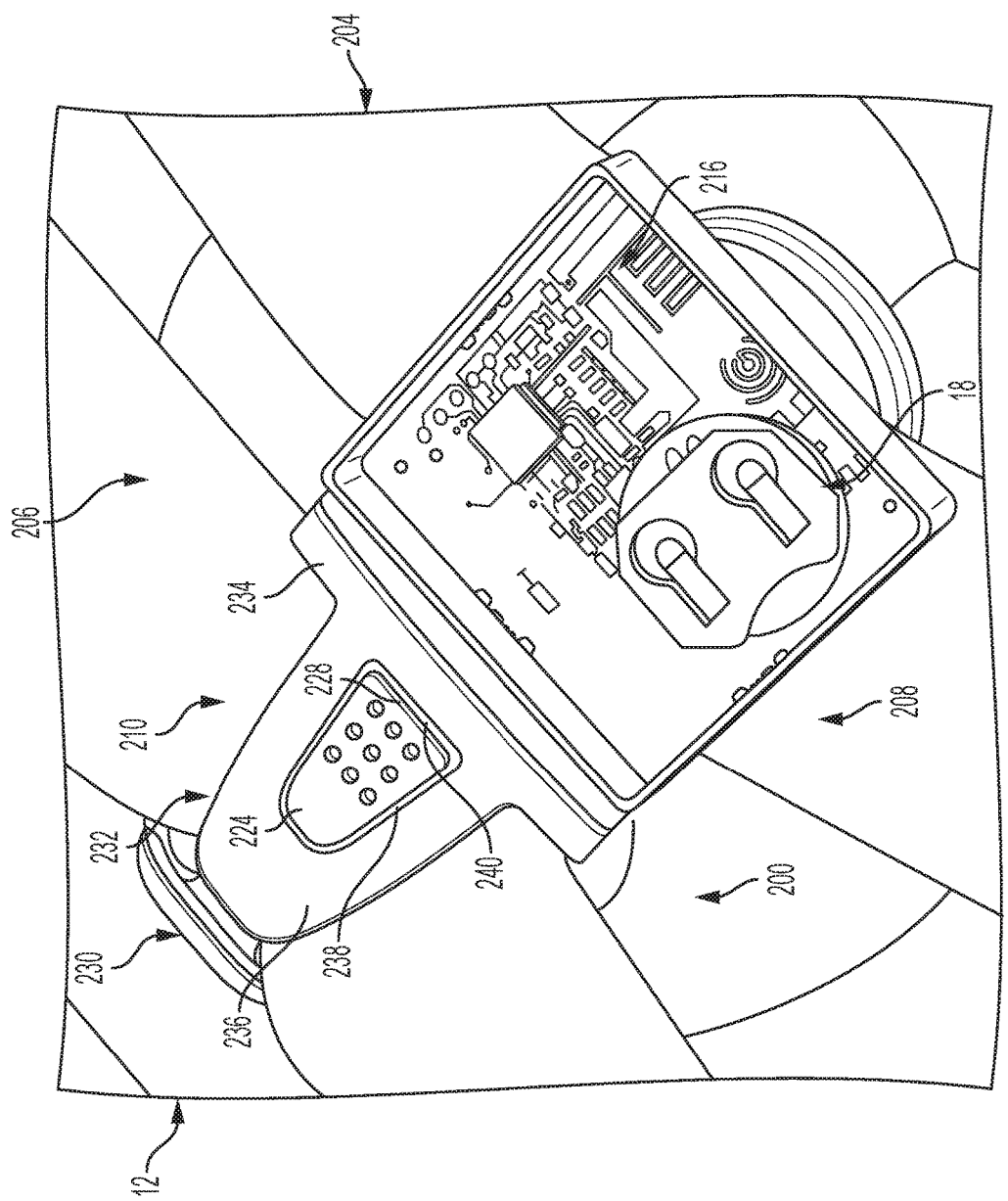
FIG. 10 is a perspective view of the chest clip of FIG. 6.

Buckle 210 is best shown in FIG. 10. Buckle 210 includes a housing 230 for receiving webbing 206 and a receptacle 232. Receptacle 232 includes an opened end 234 and a hollow body 236 with an opening 238 formed therein. The interior of body 236 is sized to receive body 220 of tongue 208 and opening 238 is sized to receive latch 224 of body 220. As will be apparent to those skilled in the art, after tongue 208 is attached to webbing 204 and buckle 210 is attached to webbing 206, chest clip 200 secures over the chest of a child in car seat 12 by inserting extension 214 of tongue 208 into body 236 of buckle 210 until latch 224 snaps into opening 238. Latch 224 is partially resilient, and compresses toward body 220 as latch 224 is moved into buckle 210. When connected as shown in FIG. 10, tongue 208 is retained in engagement with buckle 210 because distal end 228 of latch 224 engages the outer edge 240 of opening 238 and prevents lateral movement of tongue 208 away from buckle 210. Tongue 208 may be disengaged from buckle 210 by pressing latch 224 inwardly toward the chest of the child so that distal end 228 of latch 224 can clear edge 240 of opening 238, and then pulling tongue 208 laterally away from buckle 210.

In the embodiment of FIGS. 6-10 sensor device 18 is implemented on circuit board 216 of chest clip 200 rather than being incorporated into seat 12 or base 14 as described with reference to the previous embodiments. Implementation of sensor device 18 on chest clip 200 may reduce the interference in sensing the child as compared to other locations of sensor device 18 such as behind or under the child. It should be understood that in certain embodiments, webbings 204, 206 may be a standard size such that harness 202 (and chest clip 200 with sensing device 18) may be retrofit into existing car seats without a sensing device 18. It should be further understood that sensing device 18 of this embodiment may provide all of the functionality described above with reference to earlier embodiments.

While the above description has focused on car seats, car bases and harnesses, the above concepts lend themselves to many products in the childcare field. For example, cribs, crib mattresses, play yards, bassinets, and strollers all have implementations that can make use of the presence detection and caregiver alert. Still further, having indicia thereon that provides ready access to applications, user manuals, and alerts for safety reminders and recall notices have applicability across childcare product lines.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A child car seat, comprising:
a base configured to couple to a vehicle seat;
a seat configured to couple to the base;
a sensor device mounted to one of the base or the seat, the sensor device including a sensor that outputs a measurement signal indicating whether a child is present in the seat, a processor configured to receive the measurement signal and to determine, based on the measurement signal, whether the child is present in the seat, and a communication circuit controlled by the processor, the communication circuit transmitting a proximity signal in response to the processor determining that the child is present in the seat, the proximity signal being configured for reception by a first mobile device; and
an environmental sensor mounted to one of the base or the seat, the environmental sensor generating an environmental measurement representative of an environmental condition;
wherein the proximity signal causes a first alert to be communicated to a user of the first mobile device in response to the first mobile device exceeding a range from the sensor device;
wherein a second alert is communicated to a user of a second mobile device if, after a first threshold amount of time, the measurement signal continues to indicate that the child is present in the seat and no response is received by the sensor device in response to the first alert;
wherein the seat comprises a harness having a chest clip with a tongue and a buckle, the sensor device being housed within a housing of the tongue;
wherein the processor is configured to receive the environmental measurement and to determine whether the environmental measurement exceeds a maximum environmental measurement safety threshold; and
wherein the processor is configured to respond to a determination that the environmental measurement exceeds the maximum environmental measurement safety threshold by reducing the first threshold amount of time.

2. The child car seat of claim 1, wherein a third alert is communicated to an emergency service if, after a second threshold amount of time, the measurement signal continues to indicate that the child is present in the seat and no response is received by the sensor device in response to either the first alert or the second alert.

3. The child car seat of claim 1, wherein the sensor device is mounted to the base.

4. The child car seat of claim 1, further comprising an indicator on at least one of the base and the seat, the indicator being detectable by the first mobile device, wherein detection of the indicator causes the first mobile device to obtain software that provides for linking the first mobile device to the sensor device.

5. The child car seat of claim 4, wherein linking the first mobile device to the sensor device provides for the first mobile device to receive safety information from a manufacturer of the car seat.

6. The child car seat of claim 1, wherein the sensor device is programmed to transmit an alert to a vehicle alarm system to generate a vehicle alarm.

7. The child car seat of claim 1, wherein the communication circuit is configured to communicate based on a wireless communication standard.

8. The child car seat of claim 7, wherein the wireless communication standard is based on at least one of a BTLE standard, an IEEE 802.15.1 standard, and an IEEE 802.15.4 standard.

9. A child car seat, comprising:
a base configured to couple to a vehicle seat;
a seat configured to couple to the base; and
a sensor device mounted to one of the base or the seat, the sensor device including a sensor that outputs a measurement signal indicating whether a child is present in the seat, a processor configured to receive the measurement signal and to determine, based on the measurement signal, whether the child is present in the seat, and a communication circuit controlled by the processor, the communication circuit transmitting a proximity signal in response to the processor determining that the child is present in the seat, the proximity signal being configured for reception by a first mobile device;
wherein the proximity signal causes a first alert to be communicated to a user of the first mobile device in response to the first mobile device exceeding a range from the sensor device, and a second alert to be communicated to a second mobile device in response to an absence of a response to the first alert from the first mobile device for a threshold amount of time; and
wherein the sensor device is configured to receive an environmental measurement and reduce the threshold amount of time in response to the environmental measurement exceeding a maximum value.

10. The child car seat of claim 9, wherein the environmental measurement is at least one of a humidity measurement and a temperature measurement.

11. A method for child car seat proximity detection executing on a specifically programmed processor coupled to the child car seat, comprising:
generating a proximity indication representative of a proximity of a first mobile device to the child car seat;
determining, based on the proximity indication, that the first mobile device has exceeded a threshold range from the child car seat, the child car seat including a harness having a chest clip with a tongue and a buckle;
sensing, with a sensor device, whether a child is present in the child car seat, the sensor device being housed within a housing of the tongue;
generating a first abandonment alert indicating that the first mobile device has exceeded the threshold range from the child car seat;
communicating the first abandonment alert to the first mobile device;
determining that a first threshold amount of time, during which the first mobile device continues to exceed the threshold range from the child car seat, has passed without a response from the first mobile device;
responding to a determination that the first threshold amount of time, during which the first mobile device continues to exceed the threshold range from the child car seat, has passed without a response from the first mobile device by communicating a second abandonment alert to a second mobile device;
generating an environmental measurement representative of an environmental condition via an environmental sensor;
determining that the environmental measurement exceeds a maximum environmental measurement safety threshold; and
responding to a determination that the environmental measurement exceeds the maximum environmental measurement safety threshold by reducing the first threshold amount of time.

12. The method of claim 11, further comprising determining that a second threshold amount of time, during which the first mobile device continues to exceed the threshold range from the child car seat, has passed without a response from either the first mobile device or the second mobile device; and responding to a determination that the second threshold amount of time, during which the first mobile device continues to exceed the threshold range from the child car seat, has passed without a response from either the first mobile device or the second mobile device by communicating a third abandonment alert to an emergency service.

13. The method of claim 11, further comprising responding to a determination that the first threshold amount of time, during which the first mobile device continues to exceed the threshold range from the child car seat, has passed without a response from the first mobile device by generating an alert to a vehicle alarm system to generate a vehicle alarm.

14. The method of claim 11, wherein the proximity indication includes a received signal strength indicator (RSSI).

15. The method of claim 11, wherein the environmental measurement is at least one of a humidity measurement and a temperature measurement.

* * * * *